S. W. REED.
Carriage-Hub.
No. 13,919. Patented Dec. 11, 1855.
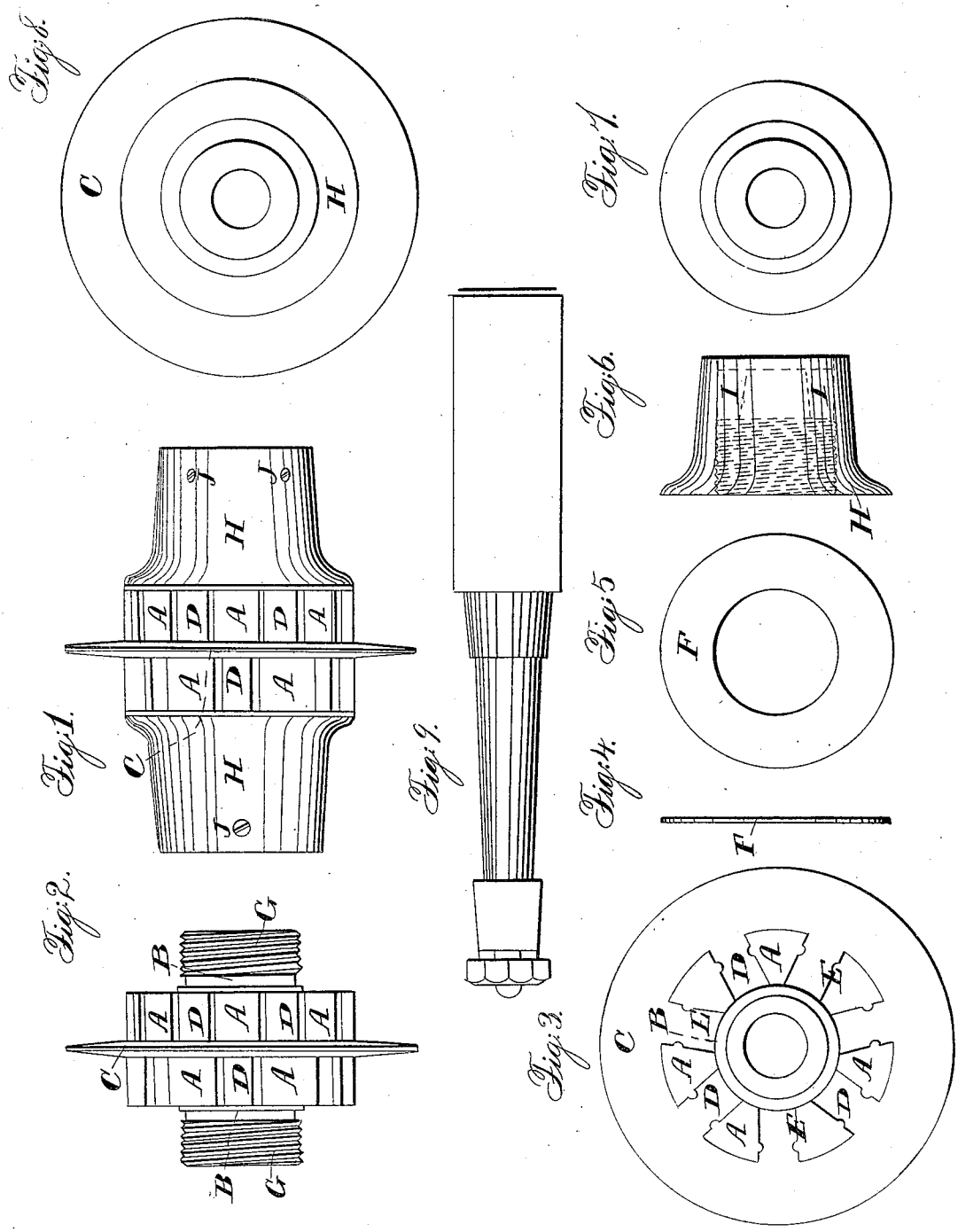

UNITED STATES PATENT OFFICE.

SHEPHERD W. REED, OF BERKSHIRE, NEW YORK.

CARRIAGE-HUB.

Specification of Letters Patent No. 13,919, dated December 11, 1855.

*To all whom it may concern:*

Be it known that I, SHEPHERD W. REED, of Berkshire, in the county of Tioga and State of New York, have invented a new and useful Improvement in Wagon and Carriage Hubs; and I do hereby declare that the following is a full, clear, and exact description of the construction and operation of the same, reference being had to the annexed drawings, making a part of this specification, in which—

Figure 1 is a perspective view. Figs. 2, 3, 4, 5, 6, 7, and 8 are sectional views. Fig. 9 is a view of the arm nut and part of the axle and not a part of the hub.

The hub is to be made of cast iron in form similar to Fig. 1.

A A are triangular shaped projections radiating from the tube B alternating each side of the central projecting flange or brace C, thus forming the sides and one end of the mortices D D for the reception of the spokes of the wheel, the spokes being driven in toward the brace C.

E E are keys, the ends being shown in Fig. 3 projecting into the mortices of the hub and serving the purpose of keying the end of the spoke firmly upon the tube B.

F F are washers; G G, screws on the end of the tube B; H H, nuts fitted to the screw G on the tube B serving the purpose of securing the spokes firmly against the brace C.

I is a movable box, shown by dotted lines in Fig. 6, and secured in it by the screws J J, rendering it easy to remove worn out boxes and introduce new ones in their stead.

I am aware that a loose disk, brace or flange has been used to support the spokes of a wheel mounted on and supported between the two flanges of a hub, each having recesses to receive the forked tenon of a spoke formed by a sawcut into which the disk is fitted. Such a hub I do not claim as that has been patented by I. B. Haydon, but What I do claim and desire to secure by Letters Patent, is—

The arrangement of the dodged mortices (D) formed on both sides of the permanent projecting flange or brace (C) by the triangularly shaped projections (A), radiating from the tube (B) for the reception of the spoke tenons, whereby a double row of spokes may be inserted in the hub and supported by the flange (C) in combination with the nuts (H) to tighten or lock the spokes, and by which a broken or worn out spoke may be removed and a new one inserted in its place without untiring the wheel, as described.

SHEPHERD W. REED.

Witnesses:
WM. H. AKINS,
C. AKINS.